US012631929B2

(12) United States Patent
Kubo

(10) Patent No.: US 12,631,929 B2
(45) Date of Patent: May 19, 2026

(54) ELECTROCHROMIC ELEMENT

(71) Applicant: CANON KABUSHIKI KAISHA, Tokyo (JP)

(72) Inventor: Wataru Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 17/845,001

(22) Filed: Jun. 21, 2022

(65) Prior Publication Data

US 2023/0041311 A1 Feb. 9, 2023

(30) Foreign Application Priority Data

Jul. 21, 2021 (JP) ................................ 2021-120311

(51) Int. Cl.

| | |
|---|---|
| ***G02F 1/153*** | (2006.01) |
| ***E06B 9/24*** | (2006.01) |
| ***F21V 14/00*** | (2018.01) |
| ***G02B 26/00*** | (2006.01) |
| ***G02F 1/15*** | (2019.01) |
| ***G02F 1/155*** | (2006.01) |
| ***G02F 1/163*** | (2006.01) |
| ***G09G 3/19*** | (2006.01) |

(52) U.S. Cl.

CPC ................ *G02F 1/163* (2013.01); *E06B 9/24* (2013.01); *G02F 1/155* (2013.01); *E06B 2009/2464* (2013.01); *G02F 2001/1536* (2013.01)

(58) Field of Classification Search

CPC ...... G02F 1/1523; G02F 1/1533; G02F 1/155; G02F 1/0102; G02F 1/163; G09G 3/16

USPC ................ 359/265–275, 277, 245–247, 242; 345/49, 105; 250/70; 348/814, 817; 438/929; 349/182–186

See application file for complete search history.

(56) References Cited

U.S. PATENT DOCUMENTS

| | | | |
|---|---|---|---|
| 4,923,289 | A | 5/1990 | Demiryont |
| 5,471,339 | A | 11/1995 | Ise et al. |

(Continued)

FOREIGN PATENT DOCUMENTS

| | | | |
|---|---|---|---|
| JP | 6-273806 | A | 9/1994 |
| JP | 2001-51308 | A | 2/2001 |

(Continued)

OTHER PUBLICATIONS

Notice of Reasons for Refusal in Japanese Application No. 2021-120311 (Jan. 2025).

(Continued)

*Primary Examiner* — Dawayne Pinkney

(74) *Attorney, Agent, or Firm* — Venable LLP

(57) ABSTRACT

The disclosed electrochromic element includes a first electrode, a second electrode opposed to the first electrode, an electrochromic layer disposed between the first electrode and the second electrode, and a plurality of first interconnections electrically connected to the first electrode. The first electrode has a single section in a first region overlapping with the electrochromic layer in a plan view. The plurality of first interconnections is electrically connected to the first electrode via a first lead-out electrode provided in a second region in contact with the first region in the plan view. A region between the plurality of first interconnections and the first electrode has a resistance lower than a region between adjacent first interconnections.

21 Claims, 11 Drawing Sheets

(56) References Cited

U.S. PATENT DOCUMENTS

| | | | |
|---|---|---|---|
| 6,631,022 | B1 | 10/2003 | Kihira et al. |
| 11,221,536 | B2 * | 1/2022 | Suzuki .................. G02F 1/1525 |
| 12,174,404 | B2 | 12/2024 | Kubo et al. |
| 2002/0044331 | A1 | 4/2002 | Agrawal et al. |
| 2014/0177028 | A1 | 6/2014 | Shrivastava et al. |

FOREIGN PATENT DOCUMENTS

| | | | |
|---|---|---|---|
| JP | 2002-537582 | A | 11/2002 |
| JP | 2020-502592 | A | 1/2020 |
| JP | 2020-95253 | A | 6/2020 |
| WO | 2017/168478 | A1 | 10/2017 |
| WO | 2018/119095 | A1 | 6/2018 |

OTHER PUBLICATIONS

Notice of Reasons for Refusal in Japanese Application No. 2021-120311 (Mar. 2025).

* cited by examiner

SCHEMATIC DIAGRAM

TRANSMISSION IMAGE

ISOTRANSMITTANCE CONTOUR PROFILE

SCHEMATIC DIAGRAM

TRANSMISSION IMAGE

ISOTRANSMITTANCE CONTOUR PROFILE

SCHEMATIC DIAGRAM

TRANSMISSION IMAGE

ISOTRANSMITTANCE CONTOUR PROFILE

SCHEMATIC DIAGRAM

TRANSMISSION IMAGE

ISOTRANSMITTANCE CONTOUR PROFILE

SCHEMATIC DIAGRAM

TRANSMISSION IMAGE

ISOTRANSMITTANCE CONTOUR PROFILE

ELECTROCHROMIC ELEMENT

BACKGROUND OF THE INVENTION

Field of the Invention

The present invention relates to an electrochromic element.

Description of the Related Art

There is known an electrochromic element using an electrochromic material in which the properties of optical absorption (absorption wavelength, absorbance) of a substance change due to electrochemical oxidation-reduction reaction. The electrochromic element is applied to a display device, a variable reflectance mirror, a variable transmission window, a variable ND (Neutral Density) filter, and the like by utilizing a characteristic that a high transmittance at the time of decoloring and a low transmittance at the time of coloring can be compatible.

One type of ND filter is an optical filter called a half ND filter. The half ND filter is a filter that reduces the transmittance of a bright portion of an object and reduces the brightness difference of the object as a whole when the brightness difference of the object is large. If the transmittance profile (position, density, gradation) of such a filter can be electronically controlled, the width of the image representation may be enlarged.

An electronic variable aperture is known as an optical filter configured to partially change the transmittance of a variable transmittance region of an electrochromic element. Japanese Patent Application Laid-Open No. H06-273806 (hereinafter called "PTL1") discloses a variable aperture having a plurality of concentrically divided electrodes. By using the plurality of electrodes divided concentrically, a part of the variable transmittance region of the electrochromic element can be controlled to have the shape of the optical aperture. Japanese Patent Application Laid-Open No. 2002-537582 (hereinafter called "PTL2") discloses a variable aperture in which interconnections are arranged along a pair of electrodes and a peripheral seal thereof. The variable aperture controls a part of the variable transmittance region of the electrochromic element to a continuous transmittance gradation by using the resistance of the electrode.

However, in an electrochromic element using electrodes divided into concentric circles as described in PTL1, the electrochromic layer of a divided portion having no electrical conduction is not colored, so that the transmittance of the divided portion is low in some cases. Further, since the transmittance of the electrochromic layer is determined for each electrode, it is difficult to realize transmittance gradation in which the transmittance continuously changes as required in the half ND filter.

In the electrochromic element described in PTL2, the control pattern of the transmittance is limited to a concentric circle or a similar shape. Therefore, it has been difficult to realize transmittance gradation in which isotransmittance contours are substantially linear, especially for a plurality of directions, as required in the half ND filter.

SUMMARY OF THE INVENTION

An object of the present invention is to provide an electrochromic element capable of realizing continuous transmittance gradation in which isotransmittance contours are substantially straight.

According to one disclosure of the present specification, there is provided an electrochromic element including a first electrode, a second electrode opposed to the first electrode, an electrochromic layer disposed between the first electrode and the second electrode, and a plurality of first interconnections electrically connected to the first electrode, wherein the first electrode has a single section in a first region overlapping with the electrochromic layer in a plan view, wherein the plurality of first interconnections is electrically connected to the first electrode via a first lead-out electrode provided in a second region in contact with the first region in the plan view, and wherein a region between the plurality of first interconnections and the first electrode has a resistance lower than a region between adjacent first interconnections.

According to another disclosure of the present specification, there is provided an electrochromic element including a first electrode, a second electrode opposed to the first electrode, an electrochromic layer disposed between the first electrode and the second electrode, and a plurality of lead-out electrodes connected to the first electrode, wherein the first electrode has a single section in a first region overlapping with the electrochromic layer in a plan view, wherein the plurality of lead-out electrodes is provided in a second region in contact with the first region in the plan view, and wherein the plurality of lead-out electrodes is spaced apart from each other in the second region.

According to still another disclosure of the present specification, there is provided an electrochromic element including a first electrode, a second electrode opposed to the first electrode, an electrochromic layer disposed between the first electrode and the second electrode, a plurality of first interconnections arranged around the first electrode, and a voltage supply unit configured to supply a voltage supplied from the plurality of first interconnections to the first electrode so as to form a potential gradient in a plane of the first electrode, wherein the first electrode has a single section in a first region overlapping with the electrochromic layer in a plan view.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
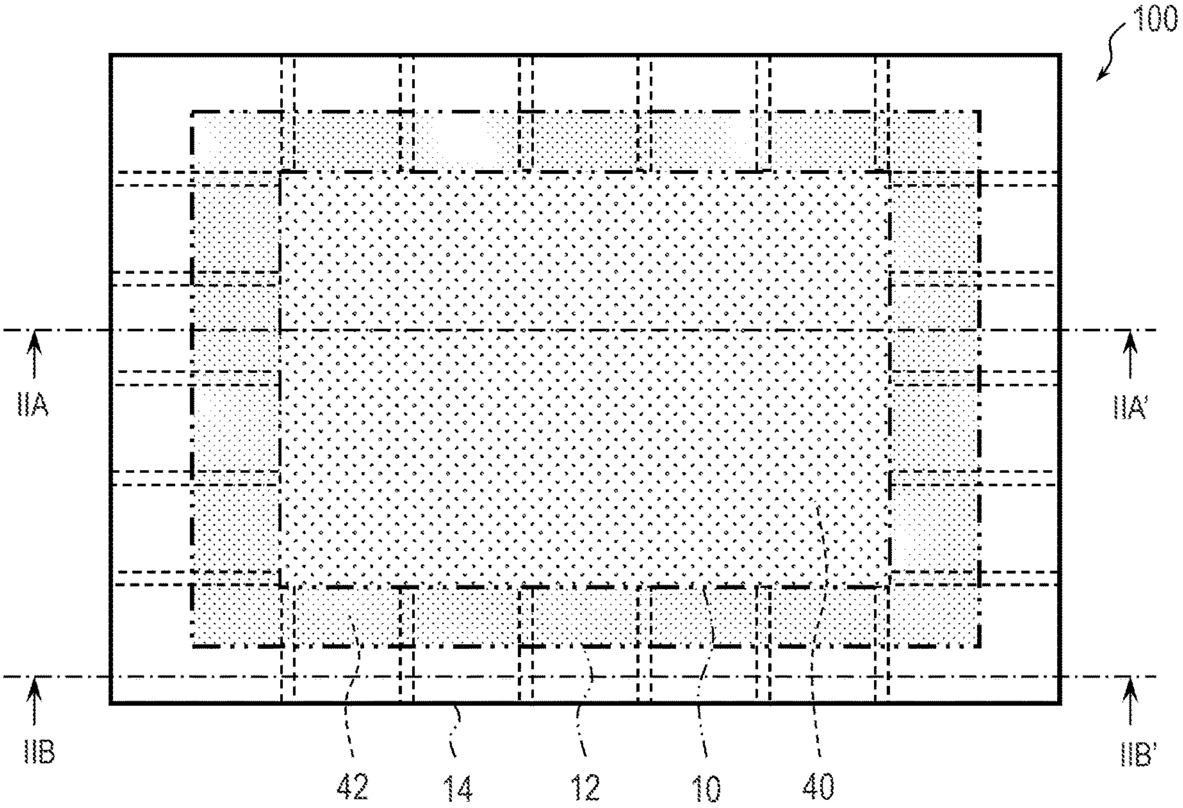
FIG. 1 is a plan view illustrating a schematic configuration of an electrochromic element according to a first embodiment of the present invention.
Figure 2A:
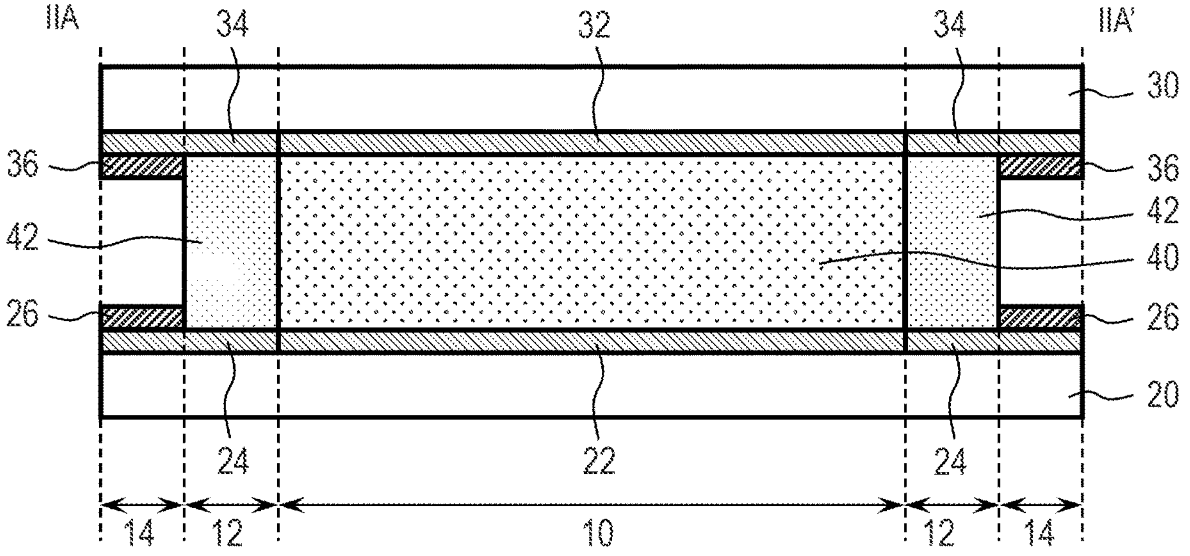
FIG. 2A and FIG. 2B are cross-sectional views illustrating a schematic configuration of the electrochromic element according to the first embodiment of the present invention.
Figure 2B:
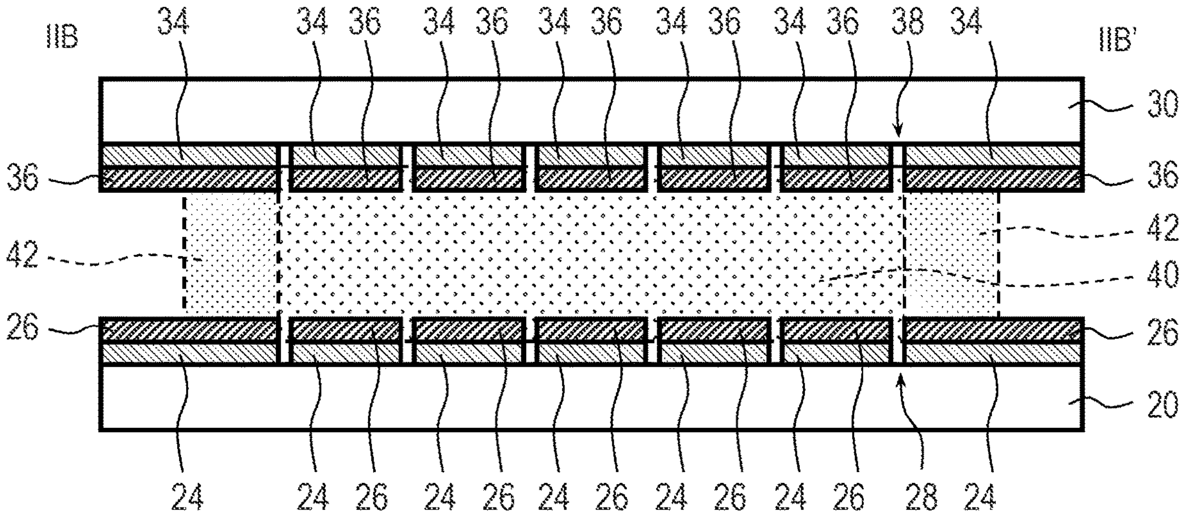
Figure 3:
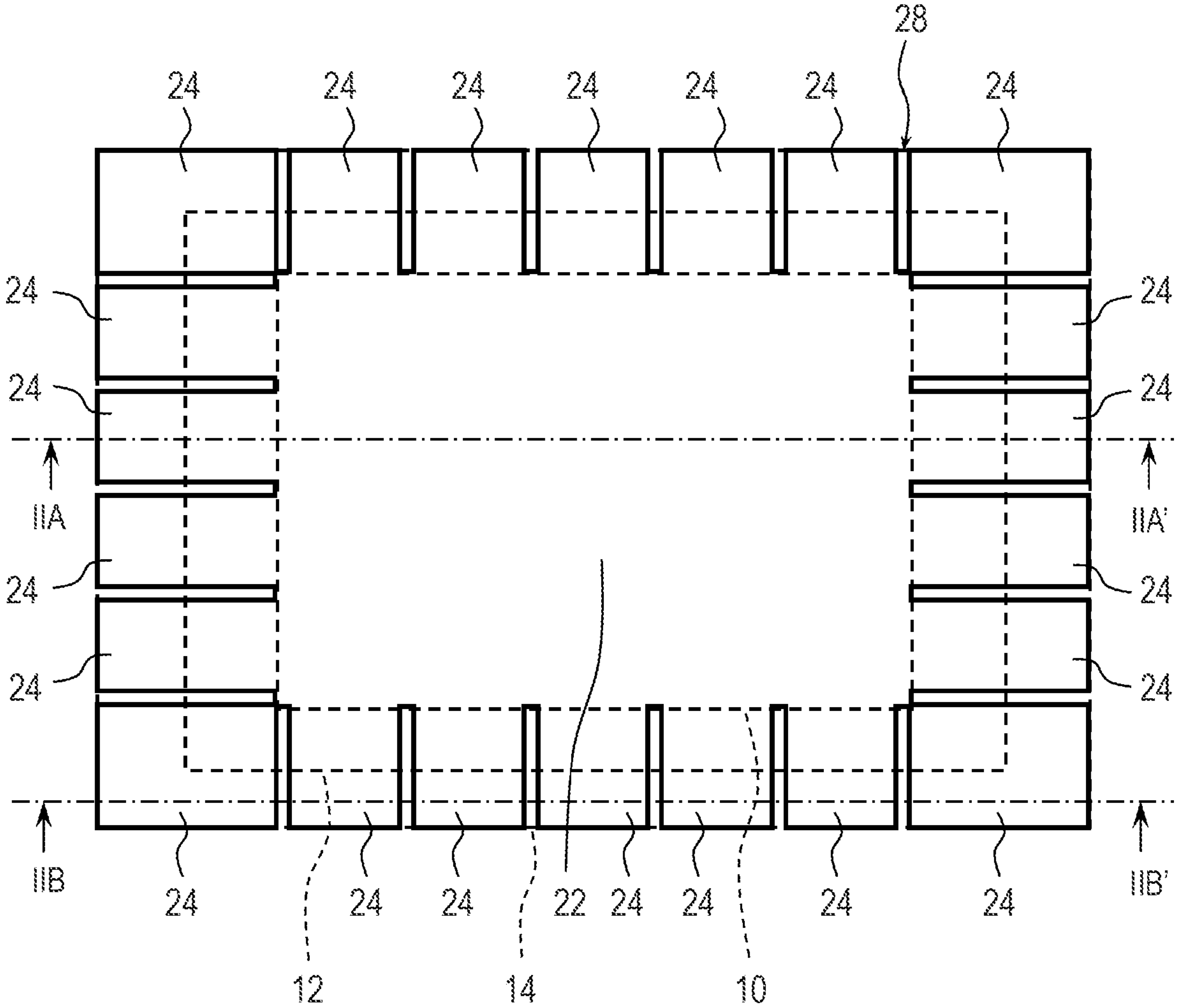
FIG. 3 is a plan view illustrating a structure of an electrode in the electrochromic element according to the first embodiment of the present invention.

A schematic configuration of an electrochromic element according to a first embodiment of the present invention will be described with reference to FIG. 1 to FIG. 3. FIG. 1 is a plan view illustrating a schematic configuration of an electrochromic element according to the present embodiment. FIG. 2A and FIG. 2B are cross-sectional views illustrating a schematic configuration of the electrochromic element according to the present embodiment. FIG. 2A is a cross-sectional view taken along line IIA-IIA' of FIG. 1, and FIG. 2B is a cross-sectional view taken along line IIB-IIB' of FIG. 1. FIG. 3 is a plan view illustrating a structure of an electrode in the electrochromic element according to the present embodiment.

As illustrated in FIG. 2A and FIG. 2B, the electrochromic element 100 according to the present embodiment includes a pair of electrodes 22 and 32, and an electrochromic layer 40 disposed between the electrodes 22 and 32. The electrode 22 is preferably provided on the support substrate 20 as a support member thereof. Similarly, the electrode 32 is preferably provided on the support substrate 30 as a support member thereof. The support substrate 20 and the support substrate 30 may be opposed to each other such that the surface on which the electrode 22 is provided and the surface on which the electrode 32 is provided face each other. As illustrated in FIG. 1, when a rectangular region 10, a frame-like region 12 surrounding the region 10, and a frame-like region 14 surrounding the region 12 are defined in a plan view, the electrodes 22 and 32 and the electrochromic layer 40 may be disposed in the region 10. The region 10 may be defined as a region where the electrodes 22 and 32 and the electrochromic layer 40 overlap in the plan view. The outer peripheral portion of the region 10 is in contact with the region 12. The outer peripheral portion of the region 12 is in contact with the region 14. The region 14 is spaced apart from the region 10. Note that a plan view in this specification is a plan view viewed from the normal direction of the electrodes 22 and 32, and corresponds to a two-dimensional plan view (FIG. 1) obtained by projecting each component of the electrochromic element 100 onto a plane parallel to the surfaces of the electrodes 22 and 32.

As illustrated in FIG. 2A to FIG. 3, a lead-out electrode 24 electrically connected to the electrode 22 is provided around the electrode 22. As illustrated in FIG. 2A and FIG. 2B, a plurality of interconnections 26 for supplying power to the electrode 22 via the lead-out electrode 24 is provided on the lead-out electrode 24. The lead-out electrode 24 is divided into a plurality of portions corresponding to the plurality of interconnections 26 by the spaced portion 28. The plurality of portions of the lead-out electrode 24 thus divided (hereinafter called a plurality of lead-out electrodes 24) is arranged so as to surround the electrode 22 in the plan view. The connection portion between one lead-out electrode 24 and the electrode 22 is separated from the connection portion between the other lead-out electrode 24 and the electrode 22. In other words, the electrical path connecting the interconnection 26 arranged on one lead-out electrode 24 and the electrode 22 and the electrical path connecting the interconnection 26 arranged on the other lead-out electrode 24 and the electrode 22 are independent from each other. Each of the plurality of lead-out electrodes 24 may be arranged to extend from the region 12 to the region 14 so as to extend outward from the region 10, for example, as illustrated in FIG. 2A and FIG. 3. The plurality of interconnections 26 may be arranged in the region 14, for example, as illustrated in FIG. 2A and FIG. 3. In one embodiment, the plurality of lead-out electrodes 24 may be formed of the same conductive layer as the conductive layer constituting the electrode 22. In this case, the plurality of lead-out electrodes 24 may be disposed on the support substrate 20 similarly to the electrode 22.

Similarly, as illustrated in FIG. 2A, a lead-out electrode 34 electrically connected to the electrode 32 is provided around the electrode 32. As illustrated in FIG. 2A and FIG. 2B, a plurality of interconnections 36 for supplying power to the electrode 32 via the lead-out electrode 34 is provided on the lead-out electrode 34. The lead-out electrode 34 is divided into a plurality of portions corresponding to the plurality of interconnections 36 by the spaced portion 38. The plurality of portions of the lead-out electrodes 34 thus divided (hereinafter called a plurality of lead-out electrodes 34) is arranged so as to surround the electrode 32 in the plan view. The connection portion between one lead-out electrode 34 and the electrode 32 is separated from the connection portion between the other lead-out electrode 34 and the electrode 32. In other words, the electrical path connecting the interconnection 36 arranged on one lead-out electrode 34 and the electrode 32 and the electrical path connecting the interconnection 36 arranged on the other lead-out electrode 34 and the electrode 32 are independent from each other. Each of the plurality of lead-out electrodes 34 may be arranged to extend from the region 12 to the region 14 so as to extend outward from the region 10, for example, as illustrated in FIG. 2A. The plurality of interconnections 36 may be disposed in the region 14, for example, as illustrated in FIG. 2A. In one embodiment, the plurality of lead-out electrodes 34 may be formed of the same conductive layer as the conductive layer constituting the electrode 32. In this case, the plurality of lead-out electrodes 34 may be disposed on the support substrate 30 similarly to the electrode 32.

The number of lead-out electrodes 24 provided on each side of the electrode 22 and the number of lead-out electrodes 34 provided on each side of the electrode 32 are not limited to the illustrated example, and may be appropriately increased or decreased. The size of each of the lead-out electrodes 24 and 34 is not particularly limited, and may be the same or at least partially different. The number and size of the lead-out electrodes 24 and 34 may be suitably set in accordance with the transmittance profile to be formed in the electrochromic layer 40.

In the present embodiment, the electrode 22 and the lead-out electrode 24 have substantially the same shape as the electrode 32 and the lead-out electrode 34, and the electrode 22 and the electrode 32 overlap each other and the lead-out electrode 24 and the lead-out electrode 34 overlap each other in the plan view. However, the electrode 22 and the lead-out electrode 24, and the electrode 32 and the lead-out electrode 34 do not necessarily have to have the same shape. One of the lead-out electrodes 24, 34 is not necessarily divided into a plurality of portions. For example, the lead-out electrode 34 connected to the electrode 32 may be configured by a frame-like pattern provided in the region 12 and the region 14. In this case, the interconnection 36 may be formed by a frame-like pattern provided over the entire region 14.

A partition wall 42 for isolating the electrochromic layer 40 from the outside may be provided around the electrochromic layer 40. In this case, for example, as illustrated in FIG. 1 and FIG. 2A, the partition wall 42 may be arranged in the region 12 in the planar view.

In an electrochromic element configured to change the transmittance over the entire electrochromic layer, in order to make the in-plane transmittance uniform, an annular metal interconnection may be arranged so as to surround the electrode in a plan view. The interconnection connected to the electrode is configured as described above, and by suppressing the potential difference inside the interconnection by the nature of the highly conductive metal, the potential difference in the electrode plane connected to the interconnection may be suppressed to be small, and as a result, the transmittance in the electrode plane may be made uniform.

Also in the electrochromic element according to the present embodiment, the interconnections 26 and 36 made of a low resistance material are used from the viewpoint of realizing efficient electrical connection between the external circuit and the electrodes 22 and 32. However, in the present embodiment, a plurality of lead-out electrodes 24 and 34 extending outward from the periphery of the electrodes 22 and 32 are provided, and independent interconnections 26 and 36 are arranged in each of the plurality of lead-out electrodes 24 and 34. This makes it easy to generate a potential difference between the lead-out electrodes 24 and between the lead-out electrodes 34, and makes it easy to partially change the transmittance in the electrode plane by increasing the potential difference in the plane of the electrodes 22 and 32 connected to the lead-out electrodes 24 and 34.

Next, the electrochromic element 100 according to the present embodiment and its respective components will be described in more detail.

(Electrochromic Element 100)

An electrochromic element is an element capable of electrically changing an absorption amount of light. The electrochromic elements include a transmission type electrochromic element that controls the amount of transmitted light and a reflection type electrochromic element that controls the amount of reflected light. Although the electrochromic element of the present embodiment may be applied to either a transmission type or a reflection type, for applications of an optical filter, a transmission type electrochromic element is mainly used.

The electrochromic elements include that using an inorganic material and that using an organic material, and the electrochromic elements using an organic material include that using a high molecular organic material and that using a low molecular organic material. Any electrochromic material may be used for the electrochromic element of the present embodiment. Among them, an electrochromic element using a low molecular organic material is particularly preferable from the viewpoint of contrast and maximum transmittance.

The control range of the light absorptance in the electrochromic element is not particularly limited, but preferably includes a range satisfying the performance as a partial variable transmittance filter. For example, an ideal control range of light absorptance may be 0% to 99%, and a practical control range of light absorptance may be 3% to 90%. In addition, in the control of the light absorptance in these ranges, it is preferable to realize stepless gradation.

(Electrochromic Layer 40)

The electrochromic layer 40 includes a material exhibiting electrochromic properties (electrochromic material). The electrochromic layer 40 may be a solid electrochromic layer formed by depositing an electrochromic material over an electrode, or a solution electrochromic layer in which an electrochromic material is dissolved in a solvent.

The electrochromic materials include inorganic electrochromic materials, organic polymeric electrochromic materials, and organic low-molecular electrochromic materials. Examples of the inorganic electrochromic material include tungsten oxide, iridium oxide, and the like. Examples of the organic polymer electrochromic material include polythiophene, polyaniline, and the like. Examples of the organic low-molecular electrochromic material include derivatives of pyridine salts, aromatic amine compounds, derivatives of heterocyclic compounds, and the like, which may be used in a state of being dissolved in a solvent.

The solvent may be suitably selected in consideration of the solubility, vapor pressure, viscosity, potential window, and the like of solutes such as electrochromic materials, depending on the application, but is preferably a polar solvent. Examples of the solvent include organic polar solvents such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methyl pyrrolidinone, dioxolane, and the like, and water. Among them, cyclic ester compounds are preferably used in terms of boiling point and solubility.

The electrochromic layer 40 may further include an electrolyte, a viscosity modifier, a UV stabilizer, or the like, as necessary. An electrolyte layer containing the electrolyte may be disposed integrally with the electrochromic layer or may be disposed so as to overlap the electrochromic layer.

A partition wall 42 is preferably used to hold the electrochromic layer 40 and the electrolyte layer between the electrodes 22 and 32 and to maintain the distance between the electrodes 22 and 32. As the partition wall 42, a sealing material is preferably used. The sealing material is preferably a material that is chemically stable, is less permeable to gases and liquids, and does not inhibit the oxidation-reduction reaction of the electrochromic material. As the sealing material, for example, an inorganic material such as glass frit, and the like, an organic material such as epoxy resin, acrylic resin, and the like, a metal material, and the like may be used.

The sealing material may function as a spacer for defining and holding the distance between the electrodes 22 and 32. In this case, the sealing material may contain a spacer material. When the sealing material does not function as a spacer, a separate spacer may be disposed to maintain the distance between the electrodes 22 and 32. Examples of the spacer material include inorganic materials such as silica beads, glass fibers, and the like, and organic materials such as polyimide, polytetrafluoroethylene, polydivinylbenzene, fluororubber, epoxy resin, and the like.

(Electrodes 22 and 32)

The electrodes 22 and 32 are responsible for controlling the coloration and decoloration of the electrochromic layer 40 by a voltage applied thereto. In the case of the transmission type electrochromic element 100, the electrode 22 and the electrode 32 are formed of a transparent electrode material. In the case of the reflection type electrochromic element 100, at least one of the electrodes 22 and 32 is formed of a transparent electrode material. The rear-side electrode of the electrodes 22 and 32 on the optical path may be a light reflecting electrode (for example, a metal electrode).

The electrodes 22 and 32 are preferably made of a material having transparency, conductivity, and stability in the oxidation-reduction reaction of the electrochromic material. Examples of such a material include transparent conductive oxide materials such as indium tin oxide (ITO), fluorine-doped tin oxide, and the like. The electrodes 22 and 32 may be formed of these electrode materials with a thin metal wire or a thin metal film provided thereon to reduce the resistance value, or a transparent conductive film using another conductive material such as carbon nanotube and the like. The sheet resistance of the electrodes 22 and 32 made of ITO is, for example, about 13.9 Ω/square.

When the electrodes 22 and 32 are disposed over a base material (e.g., the support substrate 20 and 30), the base material may be made of a material having light transmission properties. Here, "light transmission properties" means transmitting light, and may be defined as having a light transmittance of 50% or more and 100% or less, for example. Specifically, glass, a polymer compound, and the like may be used as the base material, and a coating such as an antireflective coating may be provided as necessary.

The electrodes 22 and 32 are provided in the region 10 overlapping the electrochromic layer 40 in the plan view. The electrodes 22 and 32 provided in the region 10 are formed by a single section. Here, the single section means that it is not partitioned by a high resistance portion or the like and is constituted by one continuous conductive member. A typical example is a case where the entire region 10 has uniform conductivity. If formed by a single section, an electrode having a desired in-plane distribution of conductivity, such as a configuration in which conductivity continuously changes in a plane, may be employed in order to develop desired characteristics of the optical filter.

The reason why the electrodes 22 and 32 are formed by a single section is to obtain a continuous gradation profile of the transmittance in the plane. When a part of the regions and another part of the regions of the electrodes 22 and 32 are separated by a high resistance portion or the like, an electric field cannot be applied to the electrochromic layer 40 at that portion, and the transmittance cannot be controlled. As a result, a portion of the electrochromic layer 40 overlapping with the divided portion in the plan view is in a discontinuous state in which the transmittance is different from that of the surrounding electrochromic layer 40, and a gradation profile in which the transmittance continuously changes in the plane cannot be obtained.

In this regard, in the electrochromic element 100 of the present embodiment, as described above, the electrodes 22 and 32 are formed by a single continuous section which is not partitioned by a high resistance section or the like. Therefore, according to the electrochromic element 100 of the present embodiment, it is possible to obtain the transmittance characteristic required for the half ND filter, that is, the gradation profile in which the transmittance continuously changes in the plane.

The electrodes 22 and 32 preferably have substantially a shape of a quadrilateral in the plan view. This is because an imaging element of a camera using a half ND filter has a shape of a quadrilateral in many cases, and a display device or a printing paper, which is a display body of an acquired image, has a shape of a quadrilateral in many cases. Specifically, the shape of the electrodes 22 and 32 in the plan view is preferably rectangular or similar.

(Lead-Out Electrodes 24, 34)

The lead-out electrode 24 functions as a voltage supply path when a voltage is supplied from the interconnection 26 to the electrode 22. In the present embodiment, a plurality of lead-out electrodes 24 are arranged so as to surround the electrodes 22 in the plan view. The lead-out electrodes 24 arranged adjacent to each other are separated from each other by a spaced portion 28. Each of the plurality of lead-out electrodes 24 is provided with the interconnection 26 for supplying power to the electrode 22 via the lead-out electrode 24.

Figure 4:
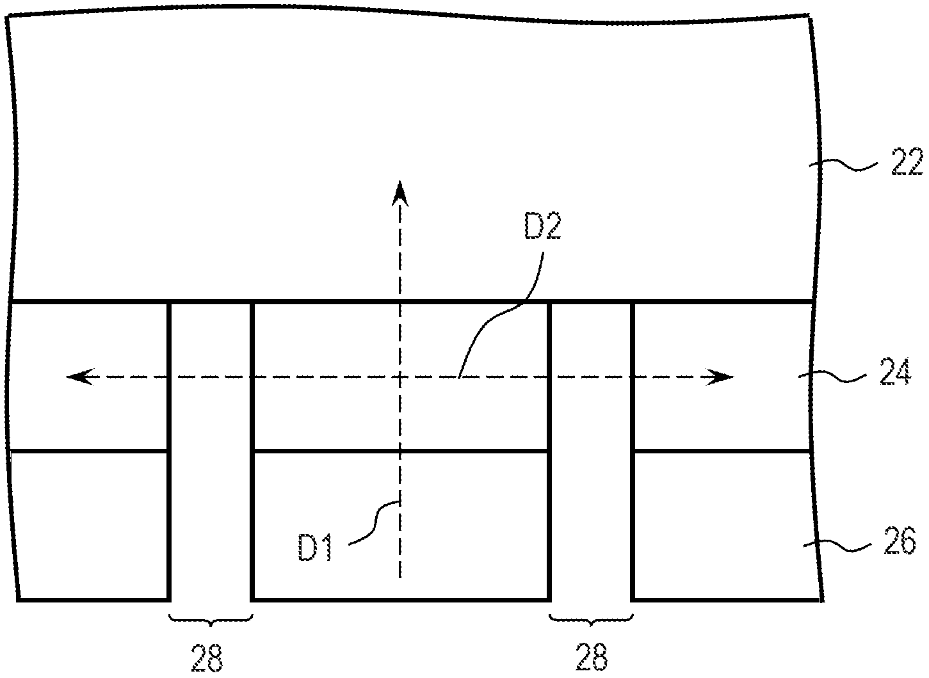
FIG. 4 is an enlarged plan view of a connection portion between an electrode and a lead-out electrode in the electrochromic element according to the first embodiment of the present invention.

FIG. 4 is an enlarged view of a connection portion between the electrode 22 and the lead-out electrode 24. As illustrated in FIG. 4, the plurality of lead-out electrodes 24 are preferably spaced apart from each other via a spaced portion 28 so as to be aligned along a direction D2 intersecting the direction D1 from the interconnection 26 toward the electrode 22. By arranging the plurality of lead-out electrodes 24 in this manner, the voltages applied to the plurality of interconnections 26 may be transmitted to the electrode 22 without reducing independency.

If the annular lead-out electrode 24 and the annular interconnection 26 are arranged so as to surround the electrode 22, it is difficult to form a desired potential distribution in the plane of the electrode 22 because the potential difference inside the interconnection 26 made of a low resistance material is small. In this regard, in the present embodiment, since the lead-out electrode 24 and the interconnection 26 are divided into a plurality of regions, a plurality of kinds of voltages may be applied from the plurality of interconnections 26 to the electrode 22 via the plurality of lead-out electrodes 24. Accordingly, a desired potential distribution may be formed in the plane of the electrode 22, and the transmittance distribution in the region 10 may be controlled.

The lead-out electrodes 24 may be preferably provided at least on one side of the electrode 22 and on the other one side opposed to the one side. This is because a transmittance gradation which changes in a direction perpendicular to the one side of the electrode 22 and the other one side opposed to the one side is often used in the half ND filter, and such an arrangement of the connecting portions is preferable for forming the transmittance gradation. A preferred transmittance gradation in the half ND filter is that a line connecting isotransmittance points in the filter (isotransmittance contour) becomes substantially linear. It is preferable that the substantially linear isotransmittance contours are substantially perpendicular to one side of the electrode 22.

The plurality of lead-out electrodes 24 are preferably arranged so as to surround the electrode 22. By arranging the plurality of lead-out electrodes 24 in this manner, it is possible to form a desired potential distribution in the entire region of the electrode 22 overlapping the region 10. For example, it is assumed that the lead-out electrodes 24 are arranged on the upper side and the lower side of the electrode 22 in the plan view, and the lead-out electrodes 24 are not arranged on the left side and the right side of the electrode 22 in the plan view. In this case, it is possible to form the potential gradient in the vertical direction of the electrode 22, but it is difficult to form the potential gradient in the horizontal direction of the electrode 22. On the other hand, as in the present embodiment, by providing the lead-out electrode 24 on all of the upper side, the lower side, the left side, and the right side of the electrode 22 so as to surround the periphery of the electrode 22, the potential gradient may be generated in all directions in the plane of the electrode 22.

Preferably, a plurality of lead-out electrodes 24 are provided on one side of the electrode 22. This is because it is preferable to form a potential gradient on the one side of the electrode 22. When the lead-out electrode 24 and the interconnection 26 are continuous along one side of the electrode 22, it is difficult to form a potential gradient along the one side of the electrode 22 because the resistance of the interconnection 26 is low. By providing the plurality of lead-out electrodes 24 on one side of the electrode 22, a potential gradient may be easily formed on the one side of the electrode 22. Note that it is not necessary to apply a voltage to the plurality of interconnections 26 arranged along the one side. Dividing the lead-out electrode 24 and the interconnection 26 along the one side also serves to prevent the potential from becoming uniform along the one side of the electrode 22 through the interconnection 26. Providing a plurality of lead-out electrodes 24 on one side of the electrode 22 is also preferable in that the density of the half ND filter may be controlled with a high degree of freedom.

Further, it is preferable that a plurality of lead-out electrodes 24 is provided on each side of the electrode 22, and a voltage can be independently supplied to the electrode 22 via the plurality of lead-out electrodes 24. Preferably, three or more lead-out electrodes 24 are provided on each side of the electrode 22, and more preferably five or more lead-out electrodes 24 are provided on each side of the electrode 22. By providing three or more connecting portions on one side of the electrode 22, it is possible to control the isotransmittance contours in the filter with a high degree of freedom. Further, by providing three or more connecting portions on each side of the electrode 22, for example, it is possible to form a transmittance gradation in which a substantially linear isotransmittance contours are inclined with respect to the sides of the electrodes 22 and 32, or a transmittance gradation in which the isotransmittance contours are curved.

The spaced portion 28 is preferably a region of higher resistance than the electrode 22, and more preferably an insulating region. For example, the sheet resistance of the spaced portion 28 is preferably 100 Ω/square or more, and more preferably 1000 Ω/square or more. The method of forming the spaced portion 28 is not particularly limited. For example, the conductive layer constituting the lead-out electrodes 24 and the conductive layer constituting the interconnections 26 may be patterned by laser processing or photolithography to form the spaced portion 28. Alternatively, the lead-out electrodes 24 and the interconnections 26 may be selectively formed in a desired region by a lift-off method or the like.

In the present embodiment, although the spaced portion 28 is provided so that the lead-out electrode 24 is divided into a plurality of portions corresponding to the plurality of interconnections 26 in the region 12 and the region 14, the configuration of the lead-out electrodes 24 are not limited to this. The spaced portion 28 has a role of forming a potential gradient corresponding to a potential difference of the applied voltage in a portion of the electrode 22 corresponding to two interconnections 26 when different voltages are supplied from the two interconnections 26. The structure of the lead-out electrode 24 may be appropriately changed as long as the lead-out electrode 24 can play this role.

For example, the lead-out electrode 24 may be configured such that a region between the interconnection 26 and the electrode 22 has a lower resistance than a region between the interconnections 26. In this case, the resistance of the region between the interconnection 26 and the electrode 22 is preferably lower than that of the region between the adjacent interconnections 26 by one digit or more. Alternatively, the lead-out electrode 24 may be configured such that a resistance value between each of the interconnections 26 and the electrode 22 is smaller than a resistance value between the interconnections 26.

For this purpose, it is desirable that the region between the interconnections 26 is the spaced portion 28 from which the lead-out electrode 24 is removed, a high-resistance region in which the lead-out electrode 24 is thinned, or a region obtained by combining these regions. Although it is preferable that the spaced portion 28 or the high-resistance region in which the lead-out electrode 24 is thinned is also provided in the region 12, the spaced portion or the high-resistance region is not necessarily provided in the region 12 if the above-described object can be achieved without the spaced portion 28 or the high-resistance region.

The above description of the lead-out electrode 24 applies also to the lead-out electrode 34 with respect to the electrode 32.

(Interconnections 26 and 36)

The electrochromic element 100 includes interconnections 26 and 36 for efficiently applying a driving voltage from an external circuit to the electrodes 22 and 32. The constituent material of the interconnections 26 and 36 is not particularly limited as long as it is a material having high conductivity per unit volume, and among them, a metal material, particularly silver, copper, aluminum, or the like is preferable. The sheet resistance of the interconnections 26 and 36 formed of silver interconnections is, for example, about 15.8 mΩ/square. As a method of forming the interconnections 26 and 36, a method in accordance with the characteristics of the interconnections 26 and 36, the electrodes 22 and 32, and the support substrates 20 and 30 may be selected, and, for example, printing using a metal paste, sputtering, plating, or the like may be applied. By combining these methods and methods such as patterning and polishing, interconnections 26 and 36 having a desired shape may be formed in a desired region.

Next, a method of driving the electrochromic element 100 according to the present embodiment will be described. The method of driving the electrochromic element 100 is not particularly limited, but may be, for example, a method in which the transmittance of the electrochromic element 100 is controlled by pulse width modulation. For example, the effective voltage applied to the electrochromic layer 40 is controlled and the transmittance is controlled by changing the ratio of the application period of the applied voltage to one cycle of the pulse voltage waveform without changing the peak value of the pulse voltage waveform applied between the electrode 22 and the electrode 32.

The electrochromic element 100 of the present embodiment includes, as means for realizing continuous transmittance gradation, voltage supply unit (lead-out electrodes 24 and 34 and interconnections 26 and 36) for forming a potential gradient in the plane of the electrodes 22 and 32. That is, a plurality of kinds of voltages are applied from an external circuit to the electrodes 22 and 32 via the interconnections 26 and 36 and the lead-out electrodes 24 and 34, to thereby form a potential gradient in the plane of the electrodes 22 and 32.

The transmittance of the electrochromic layer 40 varies depending on the effective potential difference (effective voltage) between the electrodes 22 and 32. Therefore, the voltage supplied to the electrochromic element 100 is appropriately set in accordance with the transmittance profile desired to be formed in the electrochromic layer 40. Specifically, the voltages supplied from the interconnections 26 and 36 to the electrodes 22 and 32 via the lead-out electrodes 24 and 34 are set such that the effective voltage between the electrodes 22 and 32 in each portion of the electrochromic layer 40 becomes a value necessary to realize a desired transmittance profile. Various transmission profiles may be formed in the electrochromic layer 40 by appropriately setting the respective voltages supplied to the electrodes 22 and 32 via the plurality of interconnections 26 and 36 and the plurality of lead-out electrodes 24 and 34.

The transmittance profile may be, for example, one having a gradation in which a portion having the highest transmittance has a transmittance of a maximum or close to that of the electrochromic element, and a portion having the lowest transmittance has a transmittance equal to or less than half the transmittance of the portion having the highest transmittance. A partial ND filter typified by a half ND filter is often used in applications in which the amount of light in a bright portion in an angle of view is reduced and a difference in amount of light from a dark portion is suppressed, and therefore, a filter having a higher transmittance corresponding to the dark portion is preferable in that incident light can be effectively used. When the electrochromic element 100 is used in this method, the following potential control method is preferably employed.

First, a voltage at which the electrochromic layer 40 is in a high transmission state is applied to a portion of the electrode 22 and a portion of the electrode 32 corresponding to a portion where the electrochromic layer 40 is controlled to have the highest transmittance. In addition, a voltage at which the electrochromic layer 40 is in a desired transmission state is applied to a portion of the electrode 22 and a portion of the electrode 32 corresponding to a portion where the electrochromic layer 40 is controlled to have the lowest transmittance. The potential differences between the interconnections 26 and 36 corresponding to the respective portions of the electrodes 22 and 32 are controlled so that these voltages can be applied.

As another method, it is preferable to suppress the amount of light of a bright portion within the angle of view while reducing the total amount of light. In particular, this usage is effective in moving image shooting often using the ND filters.

As described above, the electrochromic element 100 of the present embodiment realizes continuous transmittance gradation, and the electrochromic element 100 includes, as a means for realizing the continuous transmittance gradation, a voltage supply unit capable of forming a potential gradient in the plane of the electrodes 22 and 32. That is, each of the electrodes 22 and 32 is comprised of one continuous conductive electrode in order to achieve a transmittance profile with continuous transmittance gradation. The electrodes 22 and 32 are provided with a plurality of connecting portions for connecting the interconnections 26 and 36, and the connecting portions are separated from each other, whereby potential differences are easily generated between the connecting portions. Accordingly, the potential differences in the plane of the electrodes 22 and 32 may be increased, and as a result, the transmittance in the plane of the electrodes 22 and 32 may be easily changed partially.

Therefore, according to the electrochromic element 100 of the present embodiment, transmittance gradation in which transmittance continuously changes may be realized, and transmittance gradation in which isotransmittance contours are substantially linear may be realized in a plurality of directions.

By using such the electrochromic element 100 as an optical filter, a transmittance profile (position, density, gradation, etc.) may be electronically controlled with a high degree of freedom by the single filter. In addition, by applying this filter to an imaging device or the like, the width of image representation may be enlarged, and the quality of an obtained image may be improved. Further, since various transmittance profiles may be realized by one filter, it is effective in reducing the number of components and saving space.

The electrochromic element 100 of the present embodiment may be applied to an optical filter such as a variable half ND filter. The optical filter using the electrochromic element 100 of the present embodiment may be used as an imaging device, a lens unit, or a component attached to the imaging device, the lens unit, or the like. For example, the optical filter using the electrochromic element 100 of the present embodiment may be applied to a camera, a digital camera, a video camera, or a digital video camera. The optical filter using the electrochromic element 100 of the present embodiment may also be applied to products having built-in imaging devices such as cellular phones, smartphones, PCs, and tablets.

EXAMPLES (1) Preparation of EC (ElectroChromic) Element (a) Preparation of EC Element Frame According to Example A silver interconnection having a sheet resistance of 15.8 mΩ/square and a width of 2.2 mm was formed over a glass substrate (size: 37.4 mm×50.6 mm) provided with an ITO film having a sheet resistance of 22.5 Ω/square. At this time, a mask covering the regions corresponding to the region 10 (size: 28.6 mm×41.8 mm), the region 12 (width: 2.2 mm), and the spaced portion 28 was used so that silver was not deposited on these regions. The region where the silver interconnection is formed corresponds to the region 14.

Next, the ITO film in regions corresponding to the spaced portions 28 were removed using a laser processing machine to form the spaced portions 28. At this time, the sheet resistance of the spaced portions 28 was about $10^8$ Ω/square. Thus, a first electrode substrate in which the electrode 22 and the lead-out electrodes 24 made of the ITO film, and the interconnections 26 made of the silver interconnection are provided was formed. The number of lead-out electrodes 24 and interconnections 26 provided on each side of the electrode 22 was 21 on the long side and 15 on the short side.

In addition, in addition to the first electrode substrate, a second electrode substrate in which the electrode 32 and lead-out electrodes 34 made of an ITO film, and the interconnection 36 made of a silver interconnection are provided was formed by a method similar to that of the first electrode substrate.

Next, lead-out interconnections were connected to the interconnections 26 provided on the first electrode substrate and the interconnections 36 provided on the second electrode substrate, respectively.

Next, a UV curable sealing material in which spacer beads of 30 μmϕ are mixed was applied to a portion corresponding to the region 12 of the first electrode substrate and the second electrode substrate, and the first electrode substrate and the second electrode substrate were stacked so as to face the ITO surface of the first electrode substrate and the ITO surface of the second electrode substrate each other. Thereafter, UV light was irradiated to cure the sealing material, thereby forming the partition wall 42.

(b) Preparation of EC Element Frame According to Comparative Example

An EC element frame according to a comparative example was produced by using the same method as the method of producing the EC element frame according to the example. The EC element frame according to the comparative example is the same as the EC element frame according to the embodiment except that the spaced portion 28 is not provided in the ITO film and the silver interconnection.

That is, when silver interconnection was formed, an annular silver interconnection was formed in the region corresponding to the region 14 by using a mask covering the region corresponding to the region 10 and the region 12 but not covering the region corresponding to the spaced portions 28. In addition, the ITO film was not processed using a laser processing machine, and an annular lead-out electrode was formed in a region corresponding to the region 12 and the region 14.

(c) Injection of Electrolyte Solution

The electrochromic compound (EC compound) and PMMA (polymethylmethacrylate resin) were dissolved in propylene carbonate to prepare an electrolyte solution (EC solution). As the EC compound, a plurality of EC compounds (1) to (6) shown below were used.

(1)

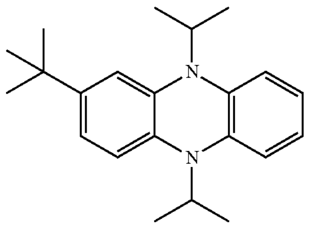

(2)

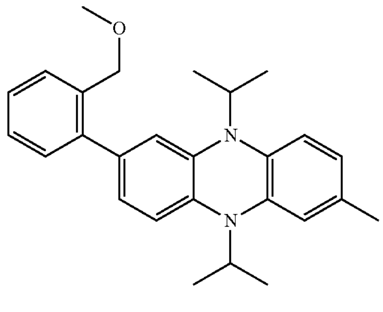

(3)

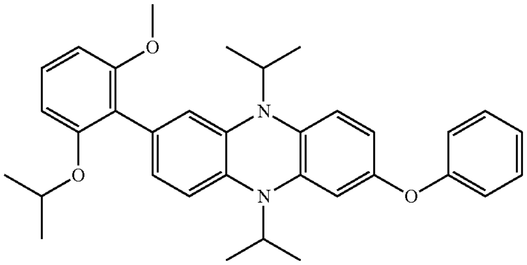

-continued (4)

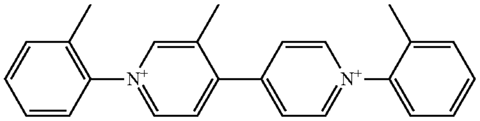

$2(CF_3SO_2)_2N^-$ (5)

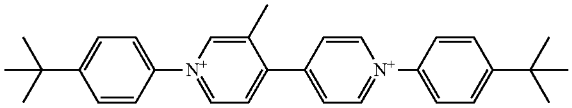

$2(CF_3SO_2)_2N^-$ (6)

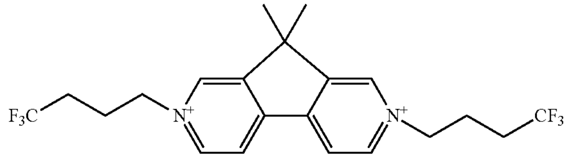

$2(CF_3SO_2)_2N^-$

The concentrations (unit: mmol/L) of the EC compounds (1) to (6) in a light-reduced state are shown in TABLE 1. The concentration of PMMA was 25 g/L.

TABLE 1

| | EC Compounds | | | | | |
|---|---|---|---|---|---|---|
| | (1) | (2) | (3) | (4) | (5) | (6) |
| Concentrations in Light-Reduced State [mmol/L] | 9.6 | 23.6 | 29.9 | 4.5 | 18.7 | 39.9 |

Next, the electrolyte solution prepared in this manner was injected into the gap serving as the electrochromic layer through the injection port (not illustrated) provided in the partition wall 42 of the EC element frame according to the example and the EC element frame according to the comparative example, and sealed with the UV curable sealant.

In the thus manufactured electrochromic element, the electrochromic layer 40 and the electrolyte layer are integrated, and the electrochromic layer 40 is in contact with the electrode 22 and the electrode 32.

(2) Evaluation of EC Element

Using parameters extracted from an electrochromic element having a unit area of 1 cm×1 cm produced using the same substrate, interconnection material, and EC solution as in the above-described Example and Comparative Example, the transmittance simulation of the electrochromic elements according to Example and Comparative Example was performed. In the transmittance simulation, the sheet resistance of the electrodes 22 and 32 and the lead-out electrodes 24 and 34 was 22.5 Ω/square (uniform in the entire region), the sheet resistance of the interconnections 26 and 36 was 15.8 me/square, and the sheet resistance of the spaced portions 28 was $10^8$ Ω/square. The applied voltage between the interconnection 26 and the interconnection 36 at the power supplying position was 0.65 V, the interconnection 26 and the interconnection 36 at the non-power supplying position were in the open state, and the distance between the electrodes 22 and 32 was 30 μm. The EC solution is as described above.

Figure 5A:
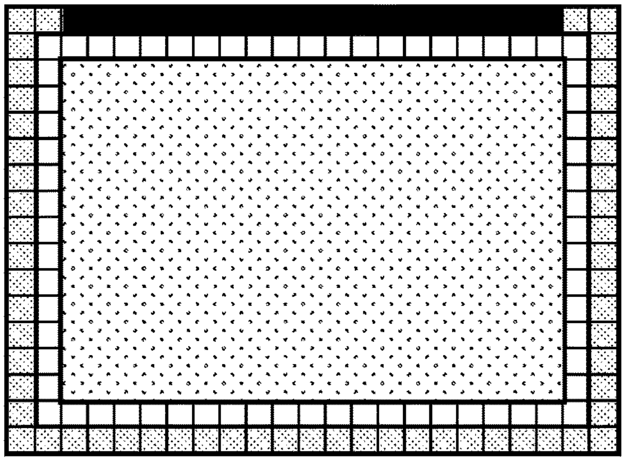
FIG. 5A, FIG. 5B, and FIG. 5C are diagrams illustrating simulation results of an electrochromic element according to an example (Part 1).
Figure 5B:
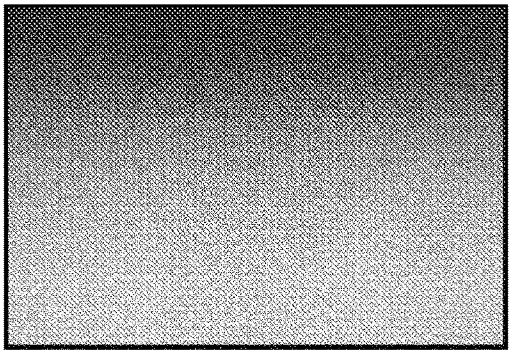
Figure 5C:
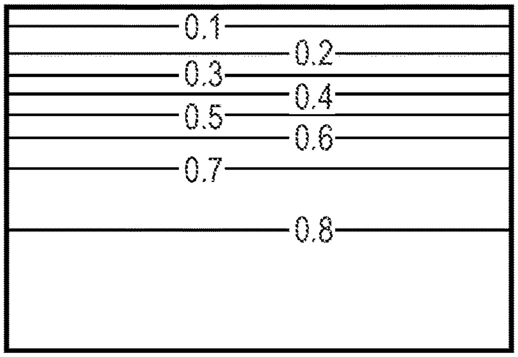
Figure 6A:
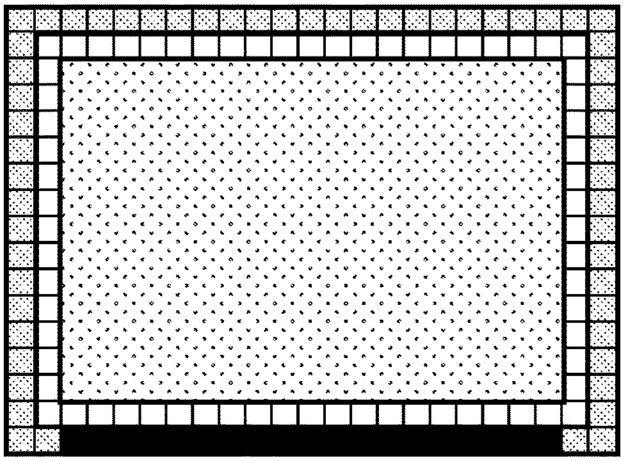
FIG. 6A, FIG. 6B, and FIG. 6C are diagrams illustrating simulation results of the electrochromic element according to the example (Part 2).
Figure 6B:
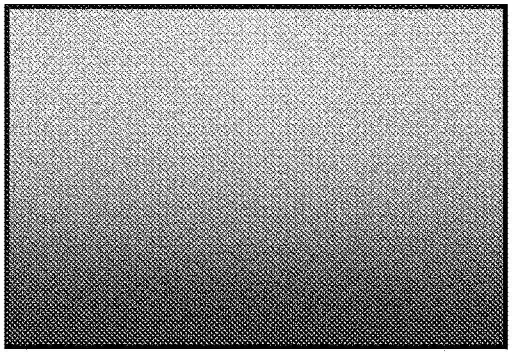
Figure 6C:
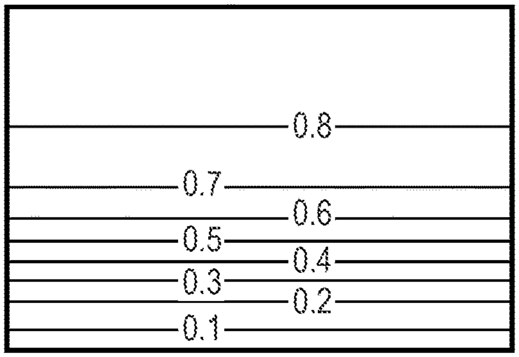
Figure 7A:
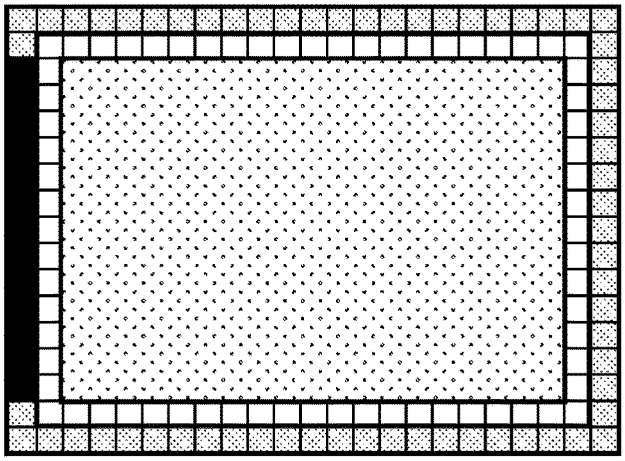
FIG. 7A, FIG. 7B, and FIG. 7C are diagrams illustrating simulation results of the electrochromic element according to the example (Part 3).
Figure 7B:
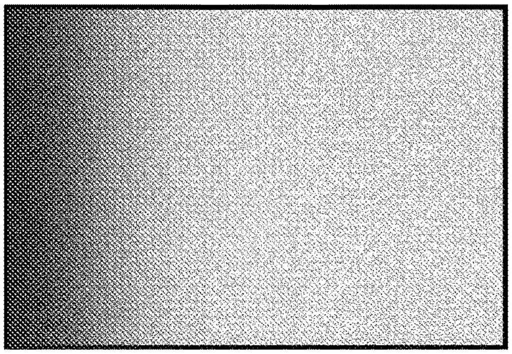
Figure 7C:
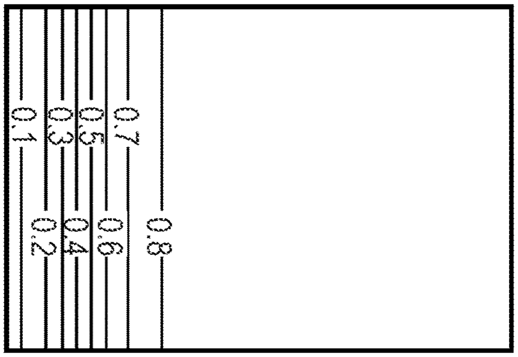
Figure 8A:
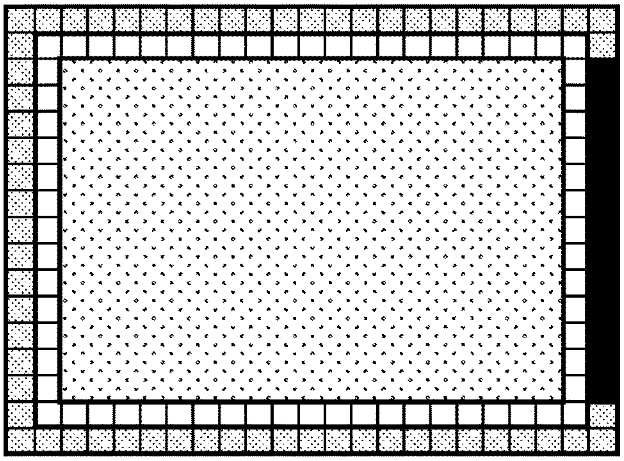
FIG. 8A, FIG. 8B, and FIG. 8C are diagrams illustrating simulation results of the electrochromic element according to the example (Part 4).
Figure 8B:
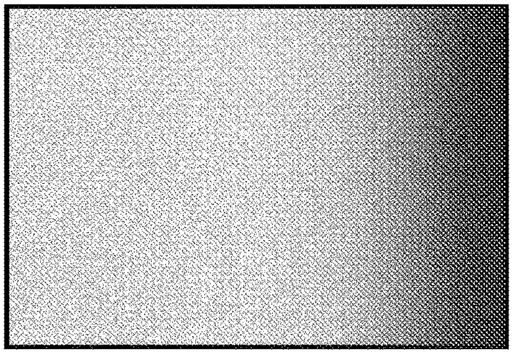
Figure 8C:
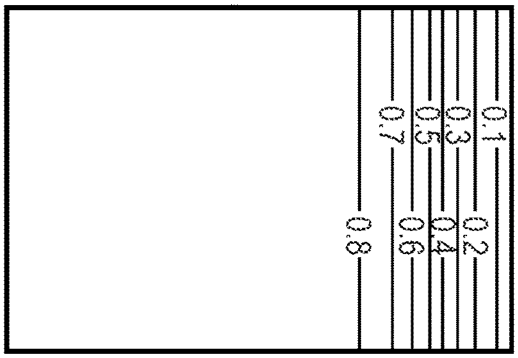

FIG. 5A to FIG. 8C illustrate the results of a transmittance simulation of the electrochromic element according to the example. FIG. 5A, FIG. 6A, FIG. 7A, and FIG. 8A are schematic views illustrating a power supplying position to the electrochromic element, FIG. 5B, FIG. 6B, FIG. 7B, and FIG. 8B are transmission images (plan view) of the region 10 at the time of applying a voltage, and FIG. 5C, FIG. 6C, FIG. 7C, and FIG. 8C are isotransmittance contour profiles of the region 10 at the time of applying a voltage. In the schematic views of FIG. 5A, FIG. 6A, FIG. 7A, and FIG. 8A, black-painted portions are power supply positions to the interconnections 26 and 36. That is, FIG. 5A, FIG. 5B, and FIG. 5C illustrate the case where power is supplied from the upper side of the electrodes 22 and 32, and FIG. 6A, FIG. 6B, and FIG. 6C illustrate the case where power is supplied from the lower side of the electrodes 22 and 32. FIG. 7A, FIG. 7B, and FIG. 7C illustrate the case where power is supplied from the left side of the electrodes 22 and 32, and FIG. 8A, FIG. 8B, and FIG. 8C illustrate the case where power is supplied from the right side of the electrodes 22 and 32. The numerical values illustrated in the isotransmittance contour profiles of FIG. 5C, FIG. 6C, FIG. 7C and FIG. 8C are transmittances.

From the simulation results illustrated in FIG. 5A to FIG. 8C, it can be confirmed that the electrochromic element according to the example can form continuous transmittance gradations in a plurality of directions. Further, in the electrochromic element according to the example, the transmittance continuously changes in the direction perpendicular to one side of the electrodes 22 and 32, and the transmittance gradation in which the isotransmittance contours are linear can be formed.

Figure 9A:
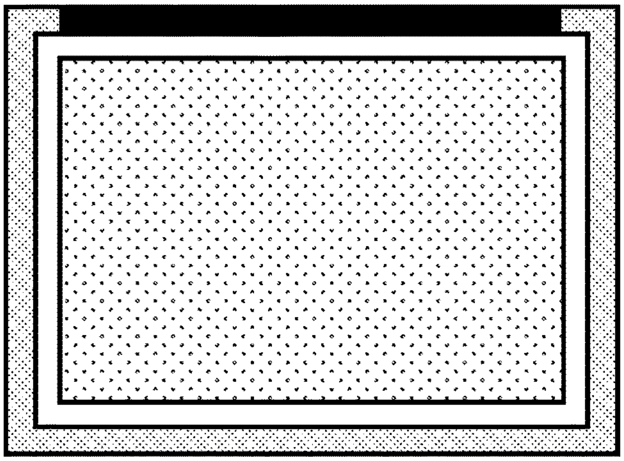
FIG. 9A, FIG. 9B, and FIG. 9C are diagrams illustrating simulation results of an electrochromic element according to a comparative example.
Figure 9B:
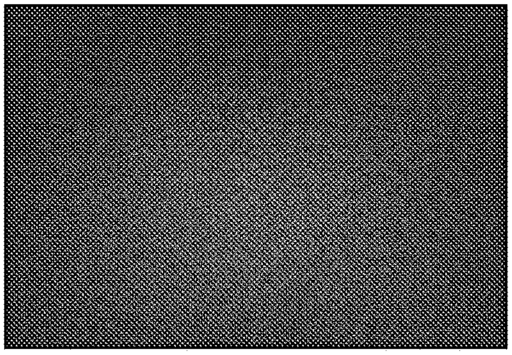
Figure 9C:
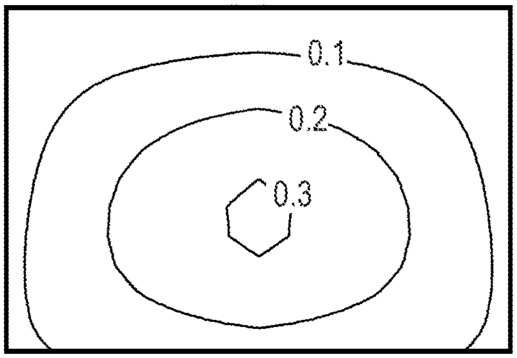

FIG. 9A to FIG. 9C illustrate the results of the transmittance simulation of the electrochromic element according to the comparative example. FIG. 9A is a schematic diagram illustrating a power supplying position to the electrochromic element, FIG. 9B is a transmission image (plan view) of the region 10 at the time of applying a voltage, and FIG. 9C is an isotransmittance contour profile of the region 10 at the time of applying a voltage. In the schematic diagram of FIG. 9A, black-painted portions indicate positions at which power is supplied to the interconnections 26 and 36.

From the simulation results illustrated in FIG. 9A to FIG. 9C, it can be confirmed that the electrochromic element according to the comparative example has a transmittance profile in which the transmittance near the center is slightly high but the transmittance is low as a whole. The tendency of the transmittance profile is not greatly changed even if the power supplying position is changed. That is, although the position of the region having a relatively high transmittance is slightly away from the power supplying position, the profile having the slightly high transmittance near the center and having a low transmittance as a whole is not changed.

Thus, the electrochromic element according to the comparative example can form a transmittance profile in which the transmittance continuously changes, but it is difficult to form continuous transmittance gradation in a plurality of directions. Further, in the electrochromic element according to the comparative example, it is difficult to form a transmittance gradation in which the transmittance continuously changes in a direction perpendicular to one side of the electrodes 22 and 32 or a transmittance gradation in which the isotransmittance contours are linear.

Second Embodiment

A lens unit according to a second embodiment of the present invention will be described. The lens unit according to the present embodiment may include an imaging optical system having a plurality of lenses and an optical filter. As the optical filter, the electrochromic element according to the first embodiment may be applied. The optical filter may include a driver circuit for driving the electrochromic element. The optical filter may be provided between the plurality of lenses of the imaging optical system or outside the lenses. The optical filter is preferably disposed on the optical axis of the lenses.

By configuring the lens unit having the optical filter using the electrochromic element according to the first embodiment, light incident on the lens unit can be modulated according to various transmittance profiles.

Third Embodiment

Figure 10A:
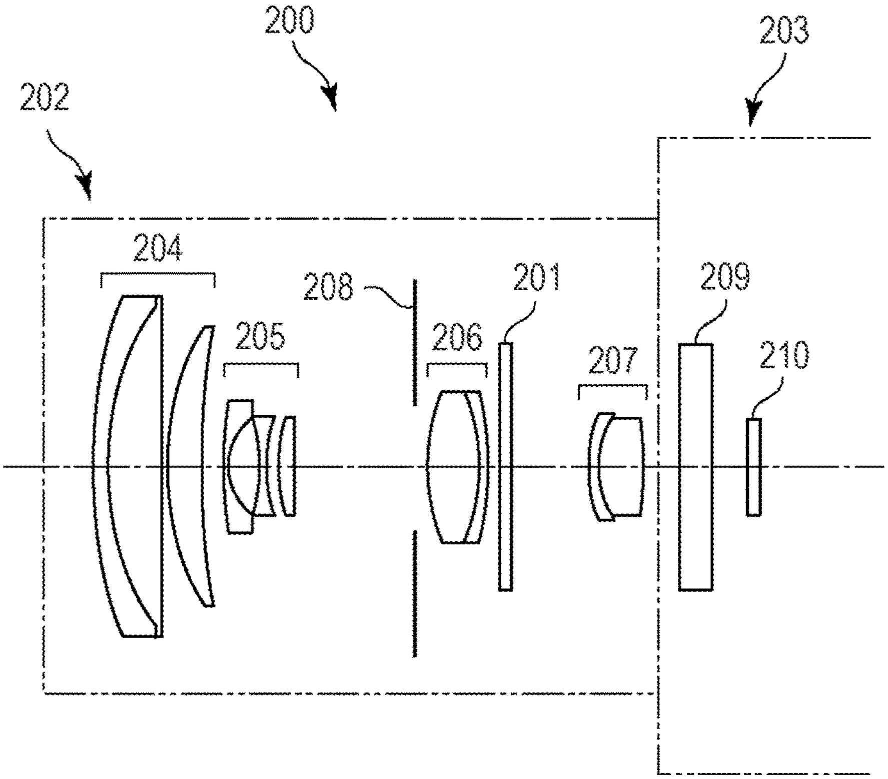
FIG. 10A and FIG. 10B are schematic diagrams illustrating a configuration example of an imaging device according to a third embodiment of the present invention.
Figure 10B:
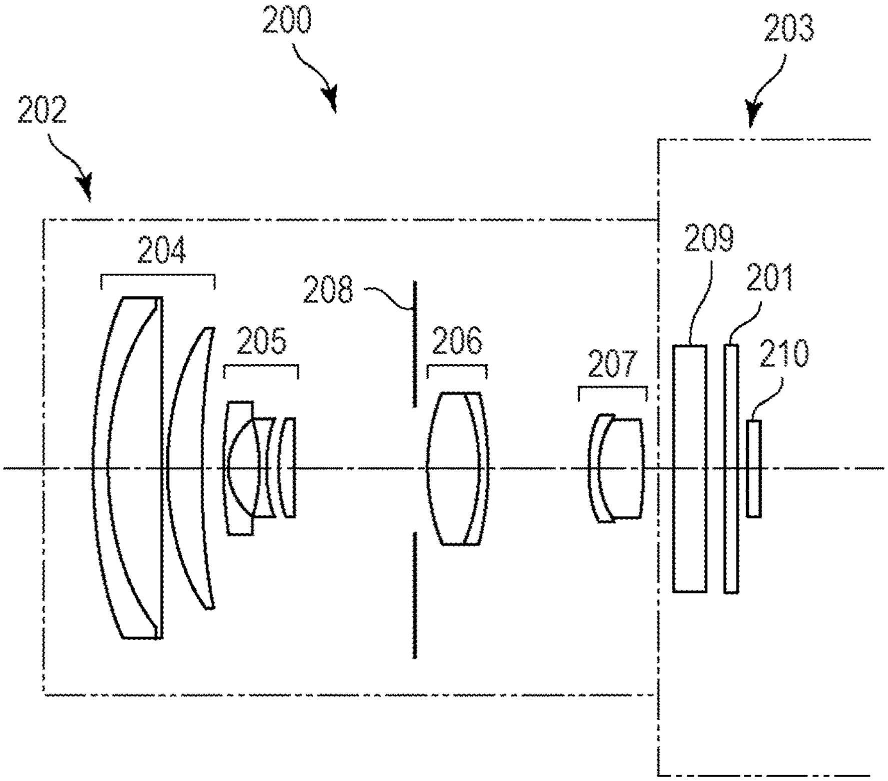

An imaging device according to a third embodiment of the present invention will be described with reference to FIG. 10A and FIG. 10B. FIG. 10A and FIG. 10B are schematic diagrams illustrating a configuration example of the imaging device according to the present embodiment.

The imaging device according to the present embodiment may include an optical filter and a light receiving element that receives light passing through the optical filter. Specific examples of the imaging device include a camera, a video camera, and a cellular phone with a camera. The imaging device may have a form in which a main body having a light receiving element and a lens unit having a lens may be separated from each other. When the imaging device can be separated into the main body and the lens unit, an optical filter separate from the imaging device is also included in the present invention. In this case, examples of the arrangement position of the optical filter include outside the lens unit, between the lens unit and the light receiving element, and between a plurality of lenses (when the lens unit has a plurality of lenses).

FIG. 10A is a schematic diagram of an example of an imaging device in which an optical filter is disposed in a lens unit. FIG. 10B is a schematic diagram of an example of an imaging device in which an optical filter is arranged in an imaging device.

The imaging device 200 includes a lens unit 202 and an imaging unit 203. The lens unit 202 includes an optical filter 201 and an imaging optical system having a plurality of lenses or lens groups. The optical filter 201 is the optical filter of the present embodiment described above.

FIG. 10A illustrates, as the lens unit 202, a rear focus type zoom lens that performs focusing behind the aperture. The lens unit 202 includes, in order from an object side, four lens groups, i.e., a first lens group 204 having positive refractive power, a second lens group 205 having negative refractive power, a third lens group 206 having positive refractive power, and a fourth lens group 207 having positive refractive power. Zooming is performed by varying the distance between the second lens group 205 and the third lens group 206, and focusing is performed by moving a part of the lens groups of the fourth lens group 207.

The lens unit 202 includes, for example, an aperture 208 between the second lens group 205 and the third lens group 206, and an optical filter 201 between the third lens group 206 and the fourth lens group 207. The light passing through the lens unit 202 passes through the first to fourth lens groups 204 to 207, the aperture 208, and the optical filter 201, and the amount of light may be adjusted using the aperture 208 and the optical filter 201.

The lens unit 202 is detachably connected to the imaging unit 203 via a mount member (not illustrated).

In the present embodiment, the optical filter 201 is disposed between the third lens group 206 and the fourth lens group 207 in the lens unit 202, but the imaging device 200 is not limited to this configuration. For example, the optical filter 201 may be located on the front (on the object side) or behind (on the imaging unit 203 side) the aperture 208, or may be located on the front, behind or inside of any one of the first to fourth lens groups 204 to 207. When the optical filter 201 is arranged at a position where light converges, there is an advantage in that the area of the optical filter 201 may be reduced.

The configuration of the lens unit 202 is not limited to the above-described configurations, and may be appropriately selected. For example, in addition to the rear focus system, an inner focus system in which focusing is performed before the aperture may be used, or another system may be used. In addition to the zoom lens, a special lens such as a fisheye lens or a macro lens may be appropriately selected.

The imaging unit 203 includes a glass block 209 and a light receiving element 210. The glass block 209 is a glass block such as a low pass filter, a face plate, or a color filter. The light receiving element 210 is a sensor unit that receives light having passed through the lens unit 202, and an imaging element such as a CCD image sensor or a CMOS image sensor may be used. Alternatively, an optical sensor such as a photodiode may be used, and an optical sensor that acquires and outputs information on the intensity or wavelength of light may be used as appropriate.

As illustrated in FIG. 10A, when the optical filter 201 is incorporated in the lens unit 202, the driving device may be disposed in the lens unit 202 or may be disposed outside the lens unit 202. When the driving device is arranged outside the lens unit 202, an electrochromic element in the lens unit 202 and the driving device are connected via wirings to control driving.

In the configuration of the imaging device 200 described above, the optical filter 201 is disposed inside the lens unit 202. However, the present invention is not limited to this configuration, and the optical filter 201 may be disposed at an appropriate position inside the imaging device 200, and the light receiving element 210 may be disposed so as to receive the light passing through the optical filter 201.

For example, as illustrated in FIG. 10B, the imaging unit 203 may include the optical filter 201. FIG. 10B is a diagram for explaining another example of the configuration of the imaging device according to the present embodiment, and is a schematic diagram of the configuration of the imaging device having the optical filter 201 in the imaging unit 203. In FIG. 10B, for example, the optical filter 201 is disposed just in front of the light receiving element 210. When the imaging device itself incorporates the optical filter 201, the lens unit 202 to be connected does not have to have the optical filter 201, so that it is possible to configure an imaging device capable of dimming using the existing lens unit 202.

The imaging device 200 of the present embodiment is applicable to a product having a combination of light amount adjustment and light receiving element. For example, the present embodiment may be applied to a camera, a digital camera, a video camera, or a digital video camera, and also to a product including an imaging device such as a cellular phone, a smartphone, a PC (Personal Computer), or a tablet PC.

According to the imaging device 200 of the present embodiment, by using the optical filter 201 as a light control member, the amount of light to be controlled may be appropriately varied by one filter, and there are advantages in that the number of members is reduced and space is saved.

Fourth Embodiment

A window member according to a fourth embodiment of the present invention will be described with reference to FIG. 11A and FIG. 11B.

The window member according to the present embodiment includes an electrochromic element and an active element connected to the electrochromic element. The active element constitutes a drive circuit that drives the electrochromic element and adjusts the amount of light passing through the electrochromic element. Examples of the active element include a transistor, and the like. The transistor may include an oxide semiconductor such as InGaZnO, or the like in the active region. The window member according to the present embodiment may also be referred to as a transmittance variable window.

Figure 11A:
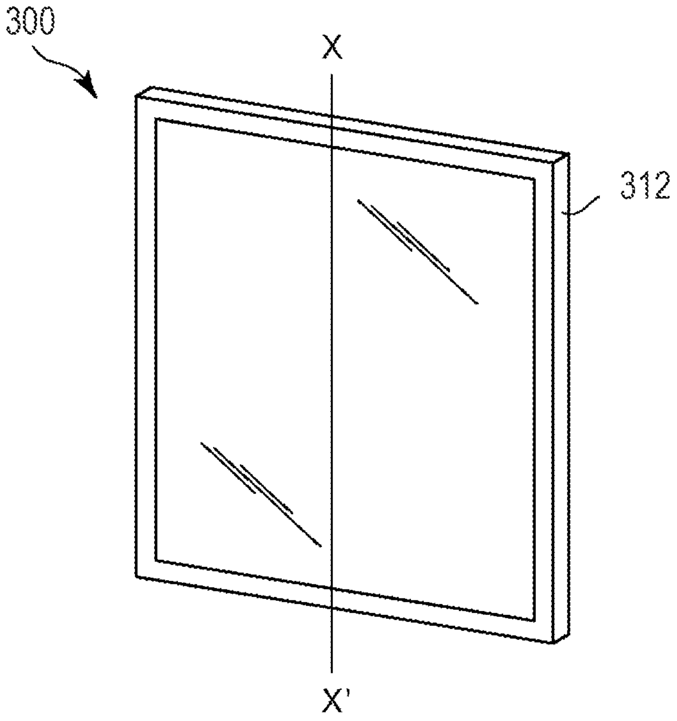
FIG. 11A and FIG. 11B are diagrams illustrating a configuration example of a window member according to a fourth embodiment of the present invention.
Figure 11B:
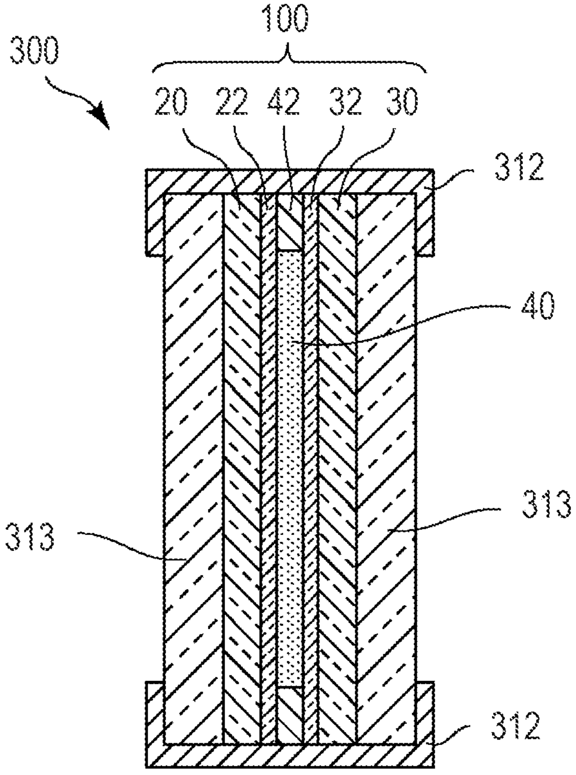

FIG. 11A is a schematic view illustrating a dimming window as a window member using an electrochromic element, and FIG. 11B is a schematic view illustrating a cross-sectional view taken along line X-X' of FIG. 11A. The dimming window 300 of the present embodiment includes an electrochromic element 100 (optical filter), transparent plates 313 sandwiching the electrochromic element 100, and a frame 312 surrounding and integrating the entirety. The electrochromic element 100 includes an unillustrated driver, which may be integrated within the frame 312 or may be disposed outside the frame 312 and connected to the electrochromic element 100 through wirings.

The transparent plates 313 are not particularly limited as long as it is a material having a high light transmittance, and is preferably a glass material in consideration of use as a window. The frame 312 may be made of any material, but may generally be considered as a frame that covers at least a portion of the electrochromic element 100 and has an integrated configuration. Although the electrochromic element 100 is a component independent of the transparent plates 313 in FIG. 11A and FIG. 11B, for example, the support substrates 20 and 30 of the electrochromic element 100 may be regarded as the transparent plates 313.

The dimming window 300 may be applied to, for example, an application for adjusting the amount of sunlight incident on a room during a daytime. Since the dimming window 300 may be applied also to adjustment of the amount of heat in addition to the amount of sunlight, it may be used to control the brightness and temperature of the room. Further, the dimming window 300 may be applied also to an application in which a view from outside to inside is blocked as a shutter. Such a dimming window 300 may be applicable not only to glass windows for buildings, but also to windows for vehicles such as automobiles, trains, airplanes, ships and the like.

MODIFIED EMBODIMENTS

The present invention is not limited to the above embodiments, and various modifications are possible.

For example, an example in which a configuration of a part of any embodiment is added to another embodiment or an example in which a configuration of a part of another embodiment is substituted is also an embodiment of the present invention.

In the above embodiments, the electrochromic element according to the present invention is applied to the optical filter, the lens unit, the imaging device, and the window member, but the application example of the electrochromic element according to the present invention is not limited thereto.

For example, an electrochromic mirror may be formed by providing a reflecting member in one light path of the electrochromic element. The electrochromic mirror may be provided in an automobile as an antiglare mirror. The electrochromic mirror may include an electrochromic element and a reflecting member inside or outside the electrochromic element. Having a reflective member therein indicates that the electrode of the electrochromic element is reflective. Having the reflecting member outside means that the reflecting member is provided in contact with the transparent electrode of the electrochromic element or through another transparent member.

According to the present invention, it is possible to realize an electrochromic element capable of forming continuous transmittance gradation in which isotransmittance contours form a substantially straight line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-120311, filed Jul. 21, 2021 which is hereby incorporated by reference herein in its entirety.

What is claimed is:

1. An electrochromic element comprising:

a first electrode;

a second electrode opposed to the first electrode;

an electrochromic layer disposed between the first electrode and the second electrode; and a plurality of first interconnections electrically connected to the first electrode, wherein the first electrode has a single section in a first region overlapping with the electrochromic layer in a plan view, wherein the plurality of first interconnections are electrically connected to the first electrode via a first lead-out electrode provided in a second region in contact with the first region in the plan view, wherein an electrical path connecting one of the plurality of first interconnections to the first electrode and an electrical path connecting another of the plurality of first interconnections to the first electrode are independent of each other, and wherein a region between the plurality of first interconnections and the first electrode has a resistance lower than a region between adjacent first interconnections.

2. The electrochromic element according to claim 1, wherein the region between the plurality of first interconnections and the first electrode has the resistance lower than the region between the adjacent first interconnections by one digit or more.

3. The electrochromic element according to claim 1, wherein a resistance value between each of the plurality of first interconnections and the first electrode is smaller than a resistance value between the adjacent first interconnections.

4. The electrochromic element according to claim 1, wherein the first lead-out electrode includes a plurality of portions corresponding to the plurality of first interconnections, and at least a part of a region between adjacent portions of the first lead-out electrode has a resistance higher than the region between the plurality of first interconnections and the first electrode.

5. The electrochromic element according to claim 4, wherein the plurality of portions of the first lead-out electrode are spaced apart from each other.

6. The electrochromic element according to claim 4, wherein the plurality of portions of the first lead-out electrodes are arranged along a direction intersecting a direction from each of the plurality of first interconnections toward the first electrode in the plan view.

7. The electrochromic element according to claim 1, wherein the second region has a frame shape surrounding the first region, and wherein the plurality of first interconnections are arranged in a third region having a frame shape surrounding the second region.

8. The electrochromic element according to claim 7, wherein the first lead-out electrode extends to the third region, and wherein the plurality of first interconnections are provided over the first lead-out electrode in the third region.

9. The electrochromic element according to claim 1, wherein voltages supplied to at least two of the plurality of first interconnections are controlled independently of each other.

10. The electrochromic element according to claim 1, further comprising an electrolyte layer provided between the first electrode and the second electrode.

11. The electrochromic element according to claim 1, wherein the first electrode has a shape of a quadrilateral in the plan view, and wherein the plurality of first interconnections are provided in a portion corresponding to one side of the quadrilateral.

12. The electrochromic element according to claim 1, wherein the first electrode has a shape of a quadrilateral in the plan view, and wherein the plurality of first interconnections are provided in a portion corresponding to one side and the other side opposite to the one side of the quadrilateral.

13. The electrochromic element according to claim 1, wherein the first electrode has a shape of a quadrilateral in the plan view, and wherein the plurality of first interconnections are provided in a portion corresponding to each side of the quadrilateral.

14. The electrochromic element according to claim 1, wherein the first electrode and the first lead-out electrode are formed of the same conductive layer.

15. The electrochromic element according to claim 1, further comprising a plurality of second interconnections electrically connected to the second electrode, wherein the second electrode has a single section in the first region, wherein the plurality of second interconnections are electrically connected to the second electrode via a second lead-out electrode provided in the second region, and wherein a region between the plurality of second interconnections and the second electrode has a resistance lower than a region between adjacent second interconnections.

16. An optical filter comprising:

the electrochromic element according to claim 1; and a driving circuit configured to drive the electrochromic element.

17. The optical filter according to claim 16, wherein the optical filter is a half ND filter.

18. A lens unit comprising:

the optical filter according to claim 16; and an imaging optical system having a plurality of lenses.

19. An imaging device comprising:

the optical filter according to claim 16; and an imaging element configured to receive a light transmitted through the optical filter.

20. A window member comprising:

the electrochromic element according to claim 1; and a driving circuit configured to drive the electrochromic element.

21. The electrochromic element according to claim 1, wherein the plurality of first interconnections are independent of each other.

* * * * *